US012412361B2

United States Patent
Chen et al.

(10) Patent No.: US 12,412,361 B2
(45) Date of Patent: Sep. 9, 2025

(54) ENTITY RECOGNITION METHOD AND APPARATUS, AND COMPUTER PROGRAM PRODUCT

(71) Applicant: Beijing Baidu Netcom Science Technology Co., Ltd., Beijing (CN)

(72) Inventors: Yushen Chen, Beijing (CN); Hongda Yue, Beijing (CN); Haiyang Xu, Beijing (CN); Guangyao Han, Beijing (CN); Liangjie Zhang, Beijing (CN); Wenhao Fang, Beijing (CN); Bohao Feng, Beijing (CN); Fei Xiao, Beijing (CN); Liangxu Quan, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 423 days.

(21) Appl. No.: 17/963,453

(22) Filed: Oct. 11, 2022

(65) Prior Publication Data

US 2023/0052906 A1    Feb. 16, 2023

(30) Foreign Application Priority Data

Nov. 25, 2021    (CN) .......................... 202111413500.4

(51) Int. Cl.
  *G06V 10/22*    (2022.01)
  *G06F 40/295*   (2020.01)
  *G06V 10/82*    (2022.01)

(52) U.S. Cl.
  CPC ............ *G06V 10/22* (2022.01); *G06F 40/295* (2020.01); *G06V 10/82* (2022.01)

(58) Field of Classification Search
  None
  See application file for complete search history.

(56) References Cited

U.S. PATENT DOCUMENTS 5,031,223 A * 7/1991 Rosenbaum .............. B07C 3/20
                                                382/101
7,636,716 B1 * 12/2009 Cheng ................... H04L 51/212
                                                707/999.102

(Continued)

FOREIGN PATENT DOCUMENTS

| CN | 106547880 A | 3/2017 |
| CN | 112733533 A | 4/2021 |
| CN | 113313114 A | 8/2021 |

OTHER PUBLICATIONS

Pan W, Jin J, Shi G, Wang QR. A system for automatic Chinese business card recognition. InProceedings of Sixth International Conference on Document Analysis and Recognition Sep. 13, 2001 (pp. 577-581). IEEE. (Year: 2001).*

(Continued)

*Primary Examiner* — Michelle M Entezari Hausmann
(74) *Attorney, Agent, or Firm* — Knobbe, Martens, Olson & Bear, LLP

(57) ABSTRACT

An entity recognition method and apparatus, an electronic device, a storage medium, and a computer program product are provided. The method includes: recognizing a to-be-recognized image to determine a preliminary recognition result for entities in the to-be-recognized image; determining, in response to determining that the preliminary recognition result includes a plurality of entities of a same category, image features of the to-be-recognized image and textual features of the plurality of entities; determining whether the plurality of entities is a consecutive complete entity based on the image features and the textual features, to obtain a complete-entity determining result; and obtaining a final recognition result based on the preliminary recognition result and the complete-entity determining result.

20 Claims, 6 Drawing Sheets

(56) References Cited

U.S. PATENT DOCUMENTS

| | | | |
|---|---|---|---|
| 9,251,141 B1* | 2/2016 | Gubin | G06F 40/40 |
| 2007/0055514 A1* | 3/2007 | Beattie | G10L 15/08 |
| | | | 704/235 |
| 2007/0179918 A1* | 8/2007 | Heisele | G06F 18/231 |
| | | | 706/13 |
| 2019/0325211 A1* | 10/2019 | Ordonez | G06F 16/285 |
| 2019/0384972 A1* | 12/2019 | Aguiar | G06N 5/01 |
| 2020/0097718 A1 | 3/2020 | Schäfer | |
| 2021/0182498 A1* | 6/2021 | Sun | G06F 40/40 |
| 2021/0374190 A1* | 12/2021 | Shepherd | G06N 3/08 |

OTHER PUBLICATIONS

Koo, Hyung Il. "Text-line detection in camera-captured document images using the state estimation of connected components." IEEE Transactions on Image Processing 25.11 (2016): 5358-5368. (Year: 2016).*

Pan, Yi-Feng, Xinwen Hou, and Cheng-Lin Liu. "A hybrid approach to detect and localize texts in natural scene images." IEEE transactions on image processing 20.3 (2010): 800-813. (Year: 2010).*

Sergio, Gwenaelle Cunha, and Minho Lee. "Stacked DeBert: All attention in incomplete data for text classification." Neural Networks 136 (2021): 87-96. (Year: 2021).*

Dai et al., An Effective Transition- based Model for Discontinuous NER, ArXiv: 2004.13454v1 [CS.CL] Apr. 28, 2020 in 11 pages.

Fisher et al., Merge and Label : A novel neural network architecture for nested NER, ArXiv: 1907.00464v1 [CS.CL] Jun. 30, 2019 in 11 pages.

Li et al., "A span-based Model for Joint Overlapped and Discontinuous Named Entity Recognition" ArXiv: 2106.14373v1 [CS.CL] Jun. 28, 2021 in 9 pages.

Li et al., "Structured Text Understanding with Multi-Modal Transformers", ArXiv: 2108.02923v3 [CS.CV] Nov. 8, 2021 in 15 pages.

Li et al., Named Entity Recognition Based on Bi-LSTM and CRF-CEL, 2020 13th Conference on Intelligent Computation Technology and Automation (ICICTA), pp. 337-341.

* cited by examiner

ENTITY RECOGNITION METHOD AND APPARATUS, AND COMPUTER PROGRAM PRODUCT

INCORPORATION BY REFERENCE TO ANY PRIORITY APPLICATIONS

The present application claims priority to Chinese Patent Application No. CN202111413500.4, titled "ENTITY RECOGNITION METHOD AND APPARATUS, AND COMPUTER PROGRAM PRODUCT", filed on Nov. 25, 2021, the disclosure of which is incorporated herein by reference in its entirety.

TECHNICAL FIELD

The present disclosure relates to the field of artificial intelligence, specifically relates to the technical field of deep learning and image recognition, more specifically relates to an entity recognition method and apparatus, an electronic device, a storage medium, and a computer program product, and may be used in a scenario of named entity recognition.

BACKGROUND

During enterprise operations, a large number of business cards will be received from suppliers or customers. These business cards contain a lot of useful information, which is required to be extracted and structured to empower the enterprise. Commonly involved technologies include a general-purpose OCR (Optical Character Recognition) technology, a NER (Named Entity Recognition) technology, a CMRC (Chinese machine reading comprehension) technology, and the like. At present, the general operations in the present industry is to first obtain text information of the business cards using the OCR technology, and then obtain structured information of key fields in the business cards using the NER technology. However, the obtained structured information will have the problem of entity discontinuity.

SUMMARY

The present disclosure provides an entity recognition method and apparatus, an electronic device, a storage medium, and a computer program product.

Some embodiments of the present disclosure provide an entity recognition method, including: recognizing a to-be-recognized image to determine a preliminary recognition result for entities in the to-be-recognized image; determining, in response to determining that the preliminary recognition result includes a plurality of entities of a same category, image features of the to-be-recognized image and textual features of the plurality of entities; determining whether the plurality of entities is a consecutive complete entity based on the image features and the textual features, to obtain a complete-entity determining result; and obtaining a final recognition result based on the preliminary recognition result and the complete-entity determining result.

Some embodiments of the present disclosure provide an entity recognition apparatus, including: a recognizing unit configured to recognize a to-be-recognized image to determine a preliminary recognition result for entities in the to-be-recognized image; a first determining unit configured to determine, in response to determining that the preliminary recognition result includes a plurality of entities of a same category, image features of the to-be-recognized image and textual features of the plurality of entities; a second determining unit configured to determine whether the plurality of entities is a consecutive complete entity based on the image features and the textual features, to obtain a complete-entity determining result; and an obtaining unit configured to obtain a final recognition result based on the preliminary recognition result and the complete-entity determining result.

Some embodiments of the present disclosure provide an electronic device, including: at least one processor; and a memory communicatively connected to the at least one processor; where the memory stores instructions executable by the at least one processor, and the instructions are executed by the at least one processor, such that the at least one processor can execute the method according to any one implementation in the first aspect.

Some embodiments of the present disclosure provide a non-transitory computer readable storage medium storing computer instructions, where the computer instructions are used for causing a computer to execute the method according to any one implementation in the first aspect.

Some embodiments of the present disclosure provide a computer program product, including a computer program, where the computer program, when executed by a processor, implements the method according to any one implementation in the first aspect.

It should be understood that contents described in the SUMMARY are neither intended to identify key or important features of embodiments of the present disclosure, nor intended to limit the scope of the present disclosure. Other features of the present disclosure will become readily understood with reference to the following description.

BRIEF DESCRIPTION OF THE DRAWINGS

The accompanying drawings are used for better understanding of the present solution, and do not impose any limitation on the present disclosure. In the drawings.

DETAILED DESCRIPTION

Example embodiments of the present disclosure are described below with reference to the accompanying drawings, including various details of the embodiments of the present disclosure to contribute to understanding, which should be considered merely as examples. Therefore, those of ordinary skills in the art should realize that various alterations and modifications may be made to the embodiments described here without departing from the scope and spirit of the present disclosure. Similarly, for clearness and conciseness, descriptions of well-known functions and structures are omitted in the following description.

In the technical solution of the present disclosure, the collection, storage, use, processing, transfer, provision, and disclosure of personal information of a user involved are in conformity with relevant laws and regulations, and do not violate public order and good customs.

Figure 1:
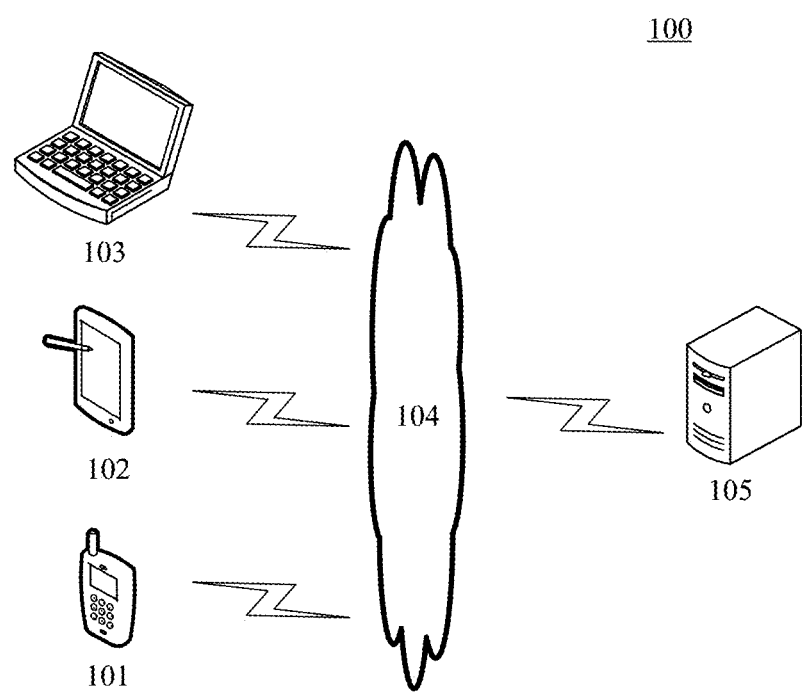
FIG. 1 is a diagram of an exemplary system architecture in which an embodiment according to the present disclosure may be implemented.

FIG. 1 shows an exemplary architecture 100 in which an entity recognition method and an entity recognition apparatus of the present disclosure may be applied.

As shown in FIG. 1, the system architecture 100 may include terminal devices 101, 102, and 103, a network 104, and a server 105. The terminal devices 101, 102, and 103 are communicatively connected to form a topological network, and the network 104 serves as a medium providing a communication link between the terminal devices 101, 102, and 103, and the server 105. The network 104 may include various types of connections, such as wired or wireless communication links, or optical cables.

The terminal devices 101, 102, and 103 may be hardware devices or software supporting network connection for data interaction and data processing. When the terminal devices 101, 102, and 103 are hardware, the terminal devices may be various electronic devices supporting functions, such as network connection, information acquisition, interaction, display, and processing, including but not limited to an image collecting device, a smart phone, a tablet computer, an ebook reader, a laptop portable computer, a desktop computer, and the like. When the terminal devices 101, 102, and 103 are software, the terminal devices may be installed in the above-listed electronic devices, may be implemented as, e.g., a plurality of software programs or software modules for providing distributed services, or may be implemented as an individual software program or software module. This is not specifically limited here.

The server 105 may be a server providing various services, e.g., a back-end server recognizing an entity in a to-be-recognized image provided by the terminal devices 101, 102, and 103. The server may send a feedback on a final recognition result of the to-be-recognized image to the terminal devices. As an example, the server 105 may be a cloud server.

It should be noted that the server may be hardware, or may be software. When the server is hardware, the server may be implemented as a distributed server cluster composed of a plurality of servers, or may be implemented as a single server. When the server is software, it may be implemented as a plurality of software programs or software modules (e.g., software or software modules for providing distributed services), or may be implemented as an individual software program or software module. This is not specifically limited here.

It should be further noted that the entity recognition method provided in embodiments of the present disclosure may be executed by the server, or may be executed by the terminal devices, or may be executed by the server and the terminal devices through cooperation with each other. Accordingly, each part (for example, each unit) included in the entity recognition apparatus may be entirely arranged in the server, or may be entirely arranged in the terminal devices, or may be arranged in the server and the terminal devices, respectively.

It should be understood that the numbers of terminal devices, networks, and servers in FIG. 1 are merely illustrative. Any number of terminal devices, networks, and servers may be provided based on actual requirements.

When an electronic device on which the entity recognition method runs does not need data transmission with other electronic devices, the system architecture may only include the electronic device (e.g., the server or the terminal devices) on which the entity recognition method runs.

Figure 2:
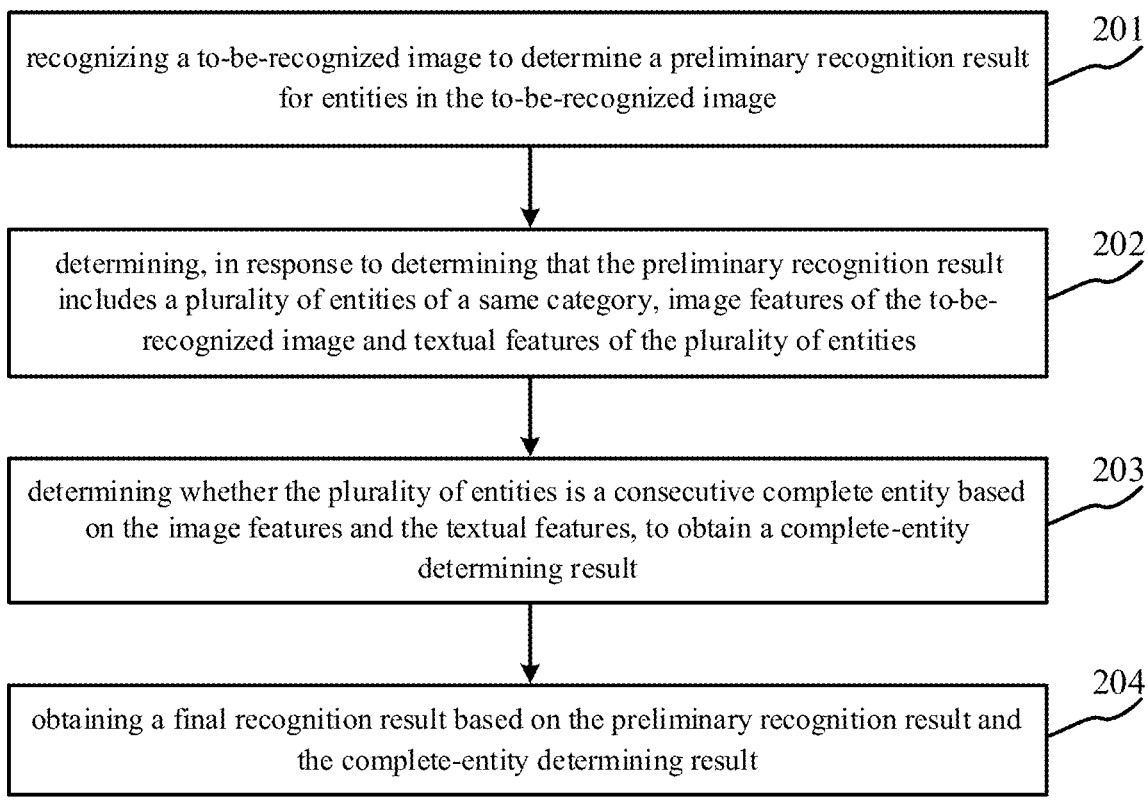
FIG. 2 is a flowchart of an entity recognition method according to an embodiment of the present disclosure.

Referring to FIG. 2, FIG. 2 is a flowchart of an entity recognition method provided in an embodiment of the present disclosure, where the flowchart 200 includes the following step 201 to step 204.

Step 201: recognizing a to-be-recognized image to determine a preliminary recognition result for entities in the to-be-recognized image.

In the present embodiment, an executing body (for example, the terminal device or the server in FIG. 1) of the entity recognition method may acquire the to-be-recognized image remotely or locally through a wired network connection or a wireless network connection, and recognize the to-be-recognized image, to determine the preliminary recognition result for the entities in the to-be-recognized image.

The to-be-recognized image may be an image including named entities need to be recognized. For example, the to-be-recognized image is a business card image or an invoice image. Taking the business card image as an example, entities included therein include named entities, such as a name, a title, a company name, and a company address.

In the present embodiment, the executing body may first recognize text information in the to-be-recognized image using an OCR technology, and then recognize the named entities in the text information using a NER technology, to obtain the preliminary recognition result corresponding to the to-be-recognized image.

In some optional implementations of the present embodiment, the executing body may execute the step 201 as follows:

first, recognizing the to-be-recognized image to obtain text information; and second, extracting, by a pre-trained global pointer model, entities in the text information to obtain the preliminary recognition result.

The global pointer model is used for extracting the entities in the text information.

In the Global Pointer model, a head and a tail of an entity are regarded as a whole for determination, and is more "comprehensive". Specifically, it is assumed that a length of a to-be-recognized text sequence in the text information is n. For simplicity, first assuming that only one type of entities is to be recognized in the text sequence, and assuming that each to-be-recognized entity is a consecutive segment with an undefined length in the text sequence, and may be mutually nested (there is an intersection between two entities), it may be concluded that the number of candidate entities in the text sequence is: $n(n+1)/2$, i.e., there are $n(n+1)/2$ different consecutive subsequences in the text sequence with the length of n.

These subsequences contain all possible entities, and what the executing body has to do is to determine real entities from the $n(n+1)/2$ candidate entities, which is actually a multi-tag classification problem of "selecting k entities from the $n(n+1)/2$ candidate entities". If m types of entities are to be recognized, it is regarded as m multi-tag classification problems of "selecting k entities from the $n(n+1)/2$ candidate entities". This shows the basic idea of Global Pointer, i.e., performing determination with an entity as a basic unit.

The Global Pointer model was originally used to solve the problem of extracting nested entities and non-nested entities. The extraction of the nested entities by the Global Pinter model naturally has a high recall rate. In the present implementation, the Global Pinter model is used to perform a task of extracting the entities in the text information, thereby improving the recognition accuracy of the named entities.

Step 202: determining, in response to determining that the preliminary recognition result includes a plurality of entities of a same category, image features of the to-be-recognized image and textual features of the plurality of entities.

In the present embodiment, the executing body may determine, in response to determining that the preliminary recognition result includes the plurality of entities of the same category, the image features of the to-be-recognized image and the textual features of the plurality of entities.

Due to the discontinuity of texts in the to-be-recognized image, text information for the same complete entity may be classified into two portions, such that a complete entity is recognized as two split entities in the preliminary recognition result.

As an example, the named entity of the company address in the business card image is "Jinian Road, Hongkou District, Shanghai, PRC," but in the business card image, the latter half of the company address "Shanghai, PRC" and the first half of the company address "Jinian Road, Hongkou District" are located on two lines, respectively, resulting in the two entities "Shanghai, PRC" and "Jinian Road, Hongkou District" corresponding to the category of the company address being included in the preliminary recognition result, which corresponds to each of the plurality of entities in the to-be-recognized image.

The preset-granularity text may be specifically set based on actual situations. As an example, the preset-granularity text may be an individual character or word. Taking a Chinese text as an example, the preset-granularity text may refer to an individual Chinese character; and taking an English text as an example, the preset-granularity text may refer to a word.

Further taking the company address being the two entities "Shanghai, PRC" and "Jinian Road, Hongkou District" as an example, text tokens include a text token corresponding to each word, such as "Shanghai" and "PRC," an image token of a local image corresponding to "Shanghai, PRC," and an image token of a local image corresponding to "Jinian Road, Hongkou District."

The position embedding feature is used for characterizing position information of each token, the segment embedding feature is used for characterizing segment information of each token, and the token embedding feature is used for characterizing word embedding information of each token.

Referring to the following table, taking the company address being "Shanghai, PRC" and "Jinian Road, District" as an example, each textual feature corresponding to each token is shown.

| [CLS] | Shanghai | PRC | [SEP] | Jinian | Road | Hongkou | District | [SEP] | [IMG] | [IMG] | [END] |
|---|---|---|---|---|---|---|---|---|---|---|---|
| A | A | A | B | B | B | B | B | B | C | C | C |
| 1 | 2 | 3 | 4 | 5 | 6 | 7 | 8 | 9 | 10 | 11 | 12 |

When the preliminary recognition result includes the plurality of entities of the same category, it is determined that there may be a named entity discontinuity in the preliminary recognition result, and it is necessary to determine the image features of the to-be-recognized image and the textual features of the plurality of entities for further determination.

As an example, the above executing body may extract the image features of the to-be-recognized image and the textual features of the plurality of entities of the same category by a feature extracting network, such as a convolutional neural network and a recurrent neural network.

In some optional implementations of the present embodiment, the executing body may execute the step 202 as follows.

First, obtaining, by a pre-trained feature extracting model, a global image feature of the to-be-recognized image and local image features of local images corresponding to the plurality of entities in the to-be-recognized image.

Each entity in the plurality of entities of the same category corresponds to a local image in the to-be-recognized image. The global image feature of the to-be-recognized image and a local image feature of each local image may be extracted by the feature extracting model. The feature extracting model may be, for example, a faster R-CNN (faster region-convolutional neural network).

Second, determining a position embedding feature, a segment embedding feature, and a token embedding feature corresponding to each token in a token sequence.

The token sequence includes a textual token corresponding to each preset-granularity text of the plurality of entities and an image token corresponding to each local image The first row to the third row in the table represent the token embedding feature, the segment embedding feature, and the position embedding feature, respectively. At a starting position, the token is represented by [CLS], the separation between the plurality of entities of the same category is represented by [SEP], the image portion is represented by [IMG], and the end is represented by [END]. The first entity in the two entities of the same category is expressed as the first sentence part, the second entity is expressed as the second sentence part, the image is expressed as the third part, and the segment embedding features corresponding to the first sentence part, the second sentence part, and the third part are A, B, and C, respectively. The corresponding position embedding feature increases sequentially from 1 until the Token is [IMG], and each [IMG] is encoded with the same position.

In the present implementation, a specific approach of determining the image features and the textual features is provided, thereby improving the comprehensiveness and accuracy of the obtained feature.

Step 203: determining whether the plurality of entities is a consecutive complete entity based on the image features and the textual features, to obtain a complete-entity determining result.

In the present embodiment, the executing body may determine whether the plurality of entities is a consecutive complete entity based on the image features and the textual features, to obtain the complete-entity determining result.

As an example, the executing body may combine the image features with the textual features to obtain a combined feature, and then process the combined feature to determine whether the plurality of entities is a consecutive complete entity, and obtain the complete-entity determining result. The complete-entity determining result may be: the plurality of entities is a consecutive complete entity and the plurality of entities is not a consecutive complete entity.

In some optional implementations of the present embodiment, the executing body may determine whether the plurality of entities is a consecutive complete entity based on the image features and the textual features as follows, to obtain the complete-entity determining result:

first, combining, for each textual token in the token sequence, a global image feature, a position embedding feature, a segment embedding feature, and a token embedding feature corresponding to the textual token, and/or, combining, for each image token in the token sequence, a local image feature, a position embedding feature, a segment embedding feature, and a token embedding feature corresponding to the image token, to obtain the combined feature; and second, inputting the combined feature into a pre-trained complete-entity determining model, to determine whether the plurality of entities is a consecutive complete entity, and obtain the complete-entity determining result.

The complete-entity determining model is used for determining whether the plurality of entities characterized by the combined feature is a consecutive complete entity, to obtain the complete-entity determining result. As an example, the complete-entity determining model may be a VL-BERT (Visual Liguistic-Bidirectional Encoder Representations from Transformers) model.

Figure 3:
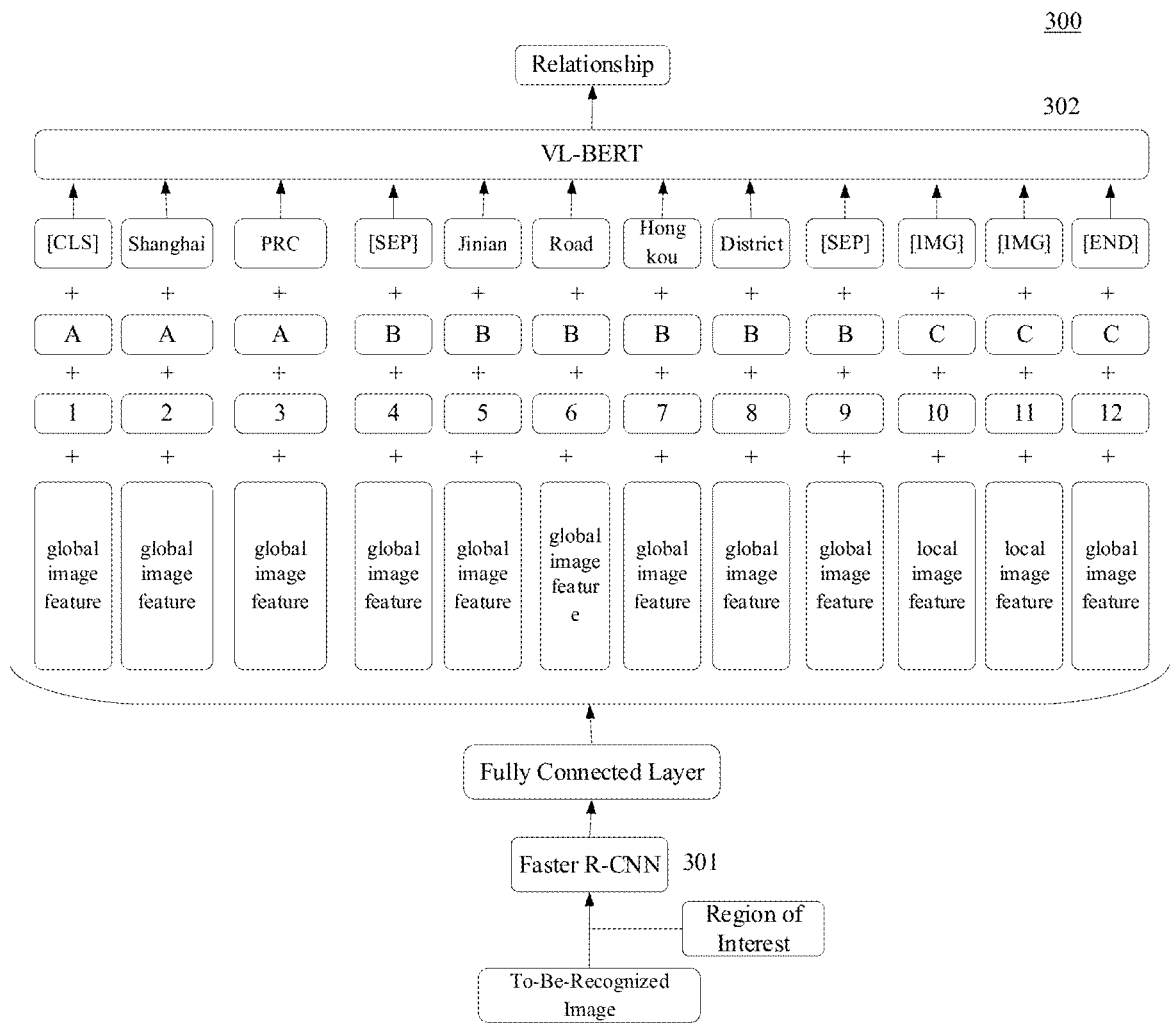
FIG. 3 is a schematic diagram of a process of determining a relationship between entities according to the present embodiment.

Referring to FIG. 3, a schematic diagram of a process 300 of recognizing a relationship between entities is shown. A to-be-recognized image is first processed by a Faster R-CNN 301 model, and a global image feature of the to-be-recognized image and local image features having a one-to-one correspondence to a plurality of entities of a same category are obtained by a fully connected layer. Taking the company address being the two entities of "Shanghai, PRC" and "Jinian Road, Hongkou District" as an example, after a local image feature or global image feature, a position embedding feature, a segment embedding feature, and a token embedding feature corresponding to each token in a token sequence corresponding to the company address are obtained, the obtained features are combined to obtain a combined feature, and the combined feature is inputted into a complete-entity determining model VL-BERT 302 to obtain a relationship among the plurality of entities.

As an example, when it is determined that the plurality of entities of the same category have a successive relationship, it may be determined that the plurality of entities of the same category belongs to a same complete entity, or otherwise, it may be considered that the plurality of entities of the same category does not belong to the same complete entity.

In the present implementation, a specific combination of image features and textual features is provided, and continuity among the plurality of entities is determined by the complete-entity determining model, thereby improving the accuracy of the operation of determining the continuity among entities.

In some optional implementations of the present embodiment, the executing body may obtain the complete-entity determining model by training as follows:

First, acquiring a training sample set. Training samples in the training sample set include a plurality of split entities and a relationship tag characterizing that the plurality of split entities belongs to a same complete entity.

Second, training the complete-entity determining model through a machine learning method, by using the plurality of split entities in the training samples as an input, and using the relationship tag in the inputted training samples as a desired output.

The complete-entity determining model may use a neural network model (e.g., a VL-BERT model) as an initial model. Specifically, the executing body first inputs the plurality of split entities in the training samples into the VL-BERT model, to obtain an actual output characterizing a relationship among the plurality of split entities; then computes a loss between the actual output and the relationship tag in the inputted training samples, then computes gradient information based on the loss; and updating a parameter of the VL-BERT model by the computed gradient based on stochastic gradient descent method. The above training process is executed cyclically until a preset termination condition is reached, thus obtaining the complete-entity determining model. The preset termination condition may be, for example, that the training time exceeds a time threshold, the number of training times exceeds a number threshold, and the loss tends to converge.

In the present implementation, an approach of training the complete-entity determining model which is based on the VL-BERT model is provided, thus improving the accuracy of the complete-entity determining model.

Step 204: obtaining a final recognition result based on the preliminary recognition result and the complete-entity determining result.

In the present embodiment, the executing body may obtain the final recognition result based on the preliminary recognition result and the complete-entity determining result.

As an example, when it is determined that the complete-entity determining result indicates that the plurality of entities is a consecutive complete entity, the plurality of entities of the same category in the preliminary recognition result is regarded as the same complete entity, to obtain the final recognition result; and when it is determined that the complete-entity determining result indicates that the plurality of entities is not a consecutive complete entity, the preliminary recognition result is directly determined as the final recognition result.

In some optional implementations of the present embodiment, the executing body splices the plurality of entities based on the preliminary recognition result, in response to determining that the plurality of entities characterized by the complete-entity determining result is a consecutive complete entity, to obtain the final recognition result.

As an example, when it is determined that two entities are entities with a successive relationship, the two entities are spliced successively to obtain a complete entity. For example, if the two entities "Shanghai, PRC" and "Jinian Road, Hongkou District" have a successive relationship, the two entities are spliced into a complete entity "Jinian Road, Hongkou District, Shanghai, PRC."

In the present implementation, the splicing of entities improves the accuracy of the final recognition result.

Figure 4:
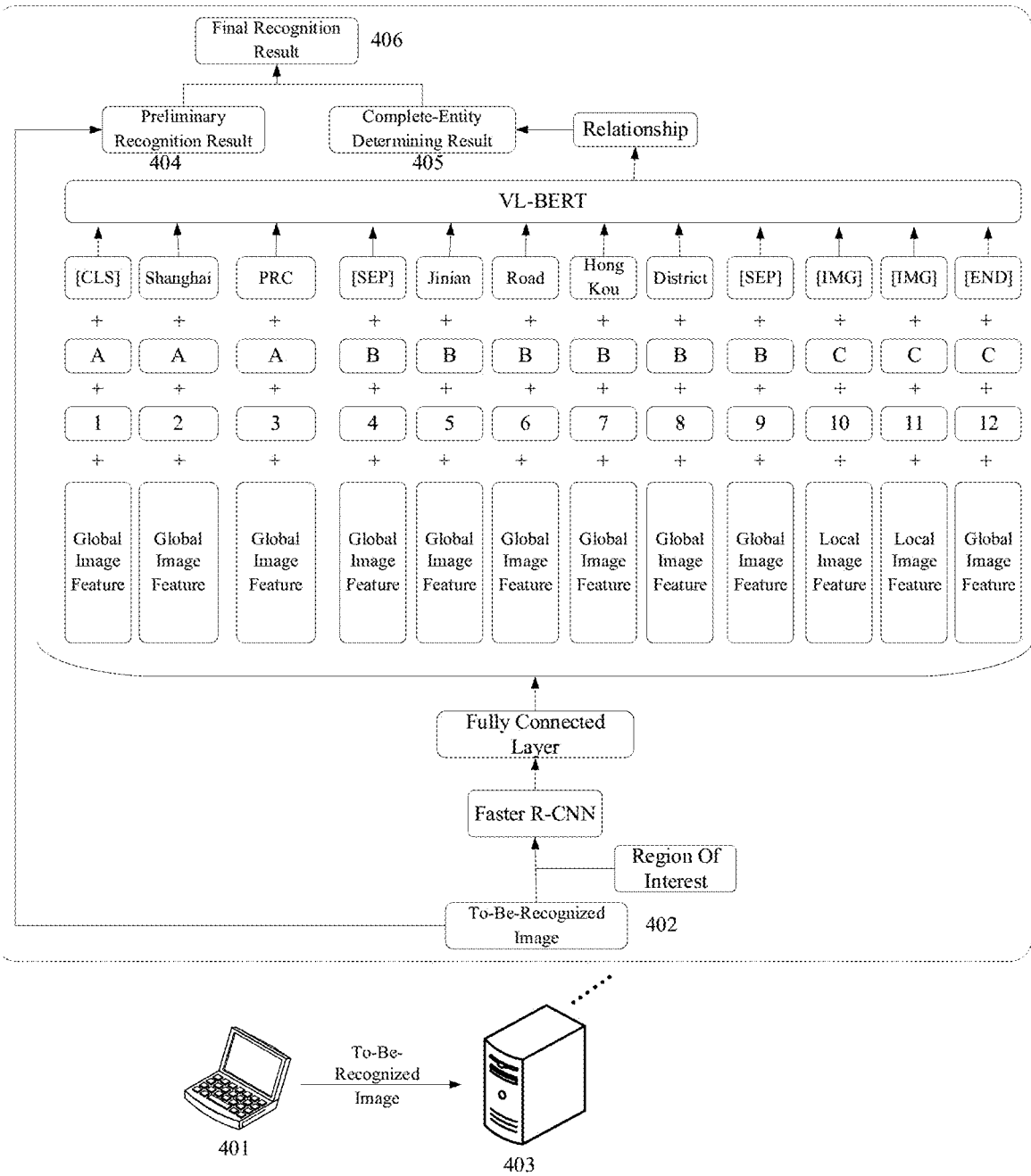
FIG. 4 is a schematic diagram of an application scenario of the entity recognition method according to the present embodiment.

Further referring to FIG. 4, FIG. 4 is a schematic diagram 400 of an application scenario of the entity recognition method according to the present embodiment. In the application scenario of FIG. 4, a terminal device 401 captures a to-be-recognized image 402, and transmits the to-be-recognized image 402 to a server 403. After the server 403 acquires the to-be-recognized image 402, the server 403 first recognizes the to-be-recognized image 402, to determine a preliminary recognition result 404 for entities in the to-be-recognized image. Then, the server determines, in response to determining that the preliminary recognition result 404 includes a plurality of entities of a same category, image features of the to-be-recognized image and textual features of the plurality of entities. Then, the server determines whether the plurality of entities is a consecutive complete entity based on the image feature and the textual feature, to obtain a complete-entity determining result 405; and finally obtains a final recognition result 406 based on the preliminary recognition result 404 and the complete-entity determining result 405.

In the present embodiment, an entity recognition method is provided, which combines, based on a preliminary recognition result of entities in a to-be-recognized image, textual features of a plurality of entities of a same category with image features of the to-be-recognized image, to determine the continuity of the plurality of entities, thereby solving the problem of the entity discontinuity, and improving the accuracy of entity recognition.

Figure 5:
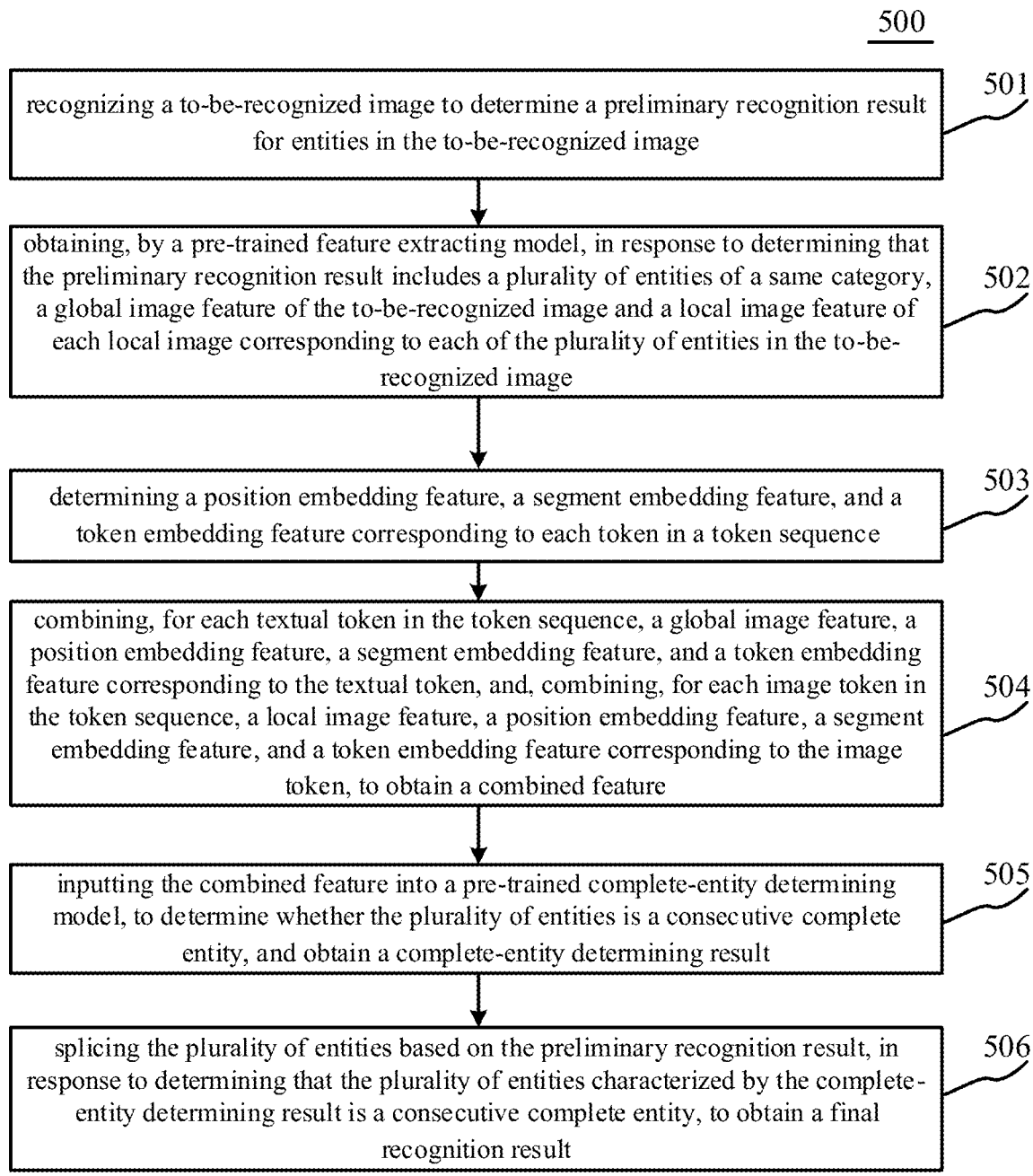
FIG. 5 is a flowchart of the entity recognition method according to another embodiment of the present disclosure.

Further referring to FIG. 5, a schematic process 500 of the entity recognition method according to an embodiment of the present disclosure is shown, including the following step 501 to step 506.

Step 501: recognizing a to-be-recognized image to determine a preliminary recognition result for entities in the to-be-recognized image.

Step 502: obtaining, by a pre-trained feature extracting model, in response to determining that the preliminary recognition result includes a plurality of entities of a same category, a global image feature of the to-be-recognized image and a local image feature of each local image corresponding to each of the plurality of entities in the to-be-recognized image.

Step 503: determining a position embedding feature, a segment embedding feature, and a token embedding feature corresponding to each token in a token sequence.

The token sequence includes a textual token corresponding to each preset-granularity text in the plurality of entities and an image token corresponding to each local image that corresponds to each of the plurality of entities in the to-be-recognized image.

Step 504: combining, for each textual token in the token sequence, a global image feature, a position embedding feature, a segment embedding feature, and a token embedding feature corresponding to the textual token, and, combining, for each image token in the token sequence, a local image feature, a position embedding feature, a segment embedding feature, and a token embedding feature corresponding to the image token, to obtain a combined feature.

Step 505: inputting the combined feature into a pre-trained complete-entity determining model, to determine whether the plurality of entities is a consecutive complete entity, and obtain a complete-entity determining result.

The complete-entity determining model is used for determining whether the plurality of entities characterized by the combined feature is a consecutive complete entity, to obtain the complete-entity determining result.

Step 506: splicing the plurality of entities based on the preliminary recognition result, in response to determining that the plurality of entities characterized by the complete-entity determining result is a consecutive complete entity, to obtain a final recognition result.

As can be seen from the present embodiment, compared with the corresponding embodiment of FIG. 2, the process 500 of the entity recognition method in the present embodiment specifically shows a process of obtaining image features and textual features, a feature combining process and a feature processing process, thereby further improving the accuracy of entity recognition.

Figure 6:
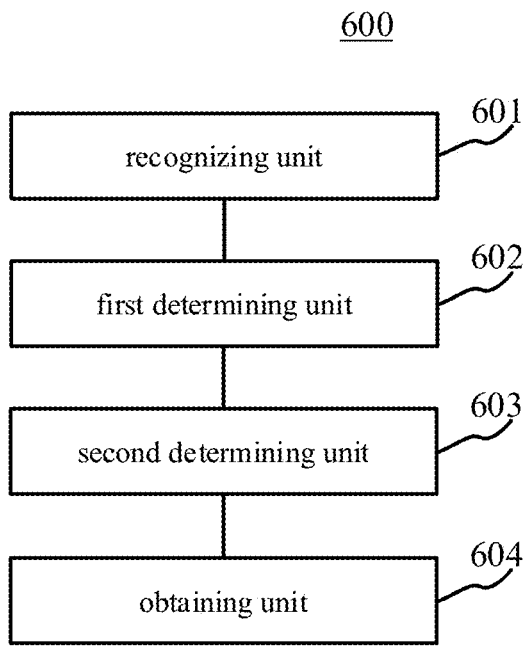
FIG. 6 is a schematic structural diagram of an entity recognition apparatus according to an embodiment of the present disclosure.

Further referring to FIG. 6, as an implementation of the method shown in the above figures, an embodiment of the present disclosure provides an entity recognition apparatus. The embodiment of the apparatus corresponds to the embodiment of the method shown in FIG. 2, and the apparatus may be specifically applied to various electronic devices.

As shown in FIG. 6, the entity recognition apparatus includes: a recognizing unit 601 configured to recognize a to-be-recognized image to determine a preliminary recognition result for entities in the to-be-recognized image; a first determining unit 602 configured to determine, in response to determining that the preliminary recognition result includes a plurality of entities of a same category, image features of the to-be-recognized image and textual features of the plurality of entities; a second determining unit 603 configured to determine whether the plurality of entities is a consecutive complete entity based on the image features and the textual features, to obtain a complete-entity determining result; and an obtaining unit 604 configured to obtain a final recognition result based on the preliminary recognition result and the complete-entity determining result.

In some optional implementations of the present embodiment, the first determining unit 602 is further configured to: obtain, by a pre-trained feature extracting model, a global image feature of the to-be-recognized image and local image features of local images corresponding to the plurality of entities in the to-be-recognized image; and determine a position embedding feature, a segment embedding feature, and a token embedding feature corresponding to each token in a token sequence, wherein the token sequence comprises a textual token corresponding to each preset-granularity text of the plurality of entities and an image token corresponding to each local image which corresponds to each of the plurality of entities in the to-be-recognized image, the position embedding feature is used for characterizing position information of the token, the segment embedding feature is used for characterizing segment information of the token, and the token embedding feature is used for characterizing embedding information of the preset granularity text corresponding to the token.

In some optional implementations of the present embodiment, the second determining unit 603 is further configured to: combine, for each textual token in the token sequence, the global image feature, the position embedding feature, the segment embedding feature, and the token embedding feature corresponding to the textual token, and/or, combine, for each image token in the token sequence, the local image feature, the position embedding feature, the segment embedding feature, and the token embedding feature corresponding to the image token, to obtain the combined feature; and input the combined feature into a pre-trained complete-entity determining model, to determine whether the plurality of entities is a consecutive complete entity, and obtain the complete-entity determining result, where the complete-entity determining model is used for determining whether the plurality of entities characterized by the combined feature is a consecutive complete entity.

In some optional implementations of the present embodiment, the second determining unit 603 is further configured to: splice the plurality of entities based on the preliminary recognition result, in response to determining that the plurality of entities characterized by the complete-entity determining result is a consecutive complete entity, to obtain a final recognition result.

In some optional implementations of the present embodiment, the recognizing unit 601 is further configured to:

recognize the to-be-recognized image to obtain text information; and extract, by a pre-trained global pointer model, entities in the text information to obtain the preliminary recognition result, wherein the global pointer model is used for extracting the entities in the text information.

In some optional implementations of the present embodiment, the apparatus further includes: a training unit (not shown in the figure) configured to: obtain the complete-entity determining model by training as follows: acquiring a training sample set, where training samples in the training sample set include a plurality of split entities and a relationship tag characterizing that the plurality of split entities belongs to a same complete entity; and training the complete-entity determining model through a machine learning method, by using the plurality of split entities in the training samples as an input, and using the relationship tag in the inputted training samples as a desired output.

In the present embodiment, an entity recognition apparatus is provided, which combines, based on a preliminary recognition result of entities in a to-be-recognized image, textual features of a plurality of entities of a same category with image features of the to-be-recognized image, to determine the continuity of the plurality of entities, thereby solving the problem of the entity discontinuity, and improving the accuracy of entity recognition.

According to an embodiment of the present disclosure, the present disclosure further provides an electronic device, including: at least one processor; and a memory communicatively connected to the at least one processor; where the memory stores instructions executable by the at least one processor, and the instructions are executed by the at least one processor, such that the at least one processor can implement the entity recognition method according to any one of the above embodiments.

According to an embodiment of the present disclosure, the present disclosure further provides a readable storage medium storing computer instructions, where the computer instructions are used for causing a computer to implement the entity recognition method according to any one of the above embodiments.

An embodiment of the present disclosure provides a computer program product, where the computer program, when executed by a processor, implements the entity recognition method according to any of the above embodiments.

Figure 7:
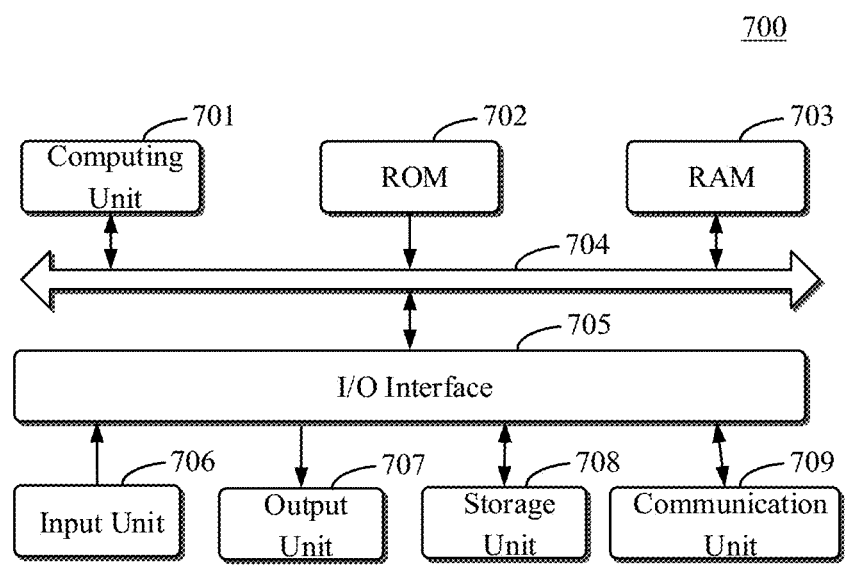
FIG. 7 is a schematic structural diagram of a computer system adapted to implement embodiments of the present disclosure.

FIG. 7 shows a schematic block diagram of an example electronic device 700 that may be configured to implement embodiments of the present disclosure. The electronic device is intended to represent various forms of digital computers, such as a laptop computer, a desktop computer, a workbench, a personal digital assistant, a server, a blade server, a mainframe computer, and other suitable computers. The electronic device may further represent various forms of mobile apparatuses, such as a personal digital assistant, a cellular phone, a smart phone, a wearable device, and other similar computing apparatuses. The components shown herein, the connections and relationships thereof, and the functions thereof are used as examples only, and are not intended to limit implementations of the present disclosure described and/or claimed herein.

As shown in FIG. 7, the device 700 includes a computing unit 701, which may execute various appropriate actions and processes in accordance with a computer program stored in a read-only memory (ROM) 702 or a computer program loaded into a random-access memory (RAM) 703 from a storage unit 708. The RAM 703 may further store various programs and data required by operations of the device 700. The computing unit 701, the ROM 702, and the RAM 703 are connected to each other through a bus 704. An input/output (I/O) interface 705 is also connected to the bus 704.

A plurality of components in the device 700 is connected to the I/O interface 705, including: an input unit 706, such as a keyboard and a mouse; an output unit 707, such as various types of displays and speakers; a storage unit 708, such as a magnetic disk and an optical disk; and a communication unit 709, such as a network card, a modem, and a wireless communication transceiver. The communication unit 709 allows the device 700 to exchange information/data with other devices via a computer network such as the Internet and/or various telecommunication networks.

The computing unit 701 may be various general-purpose and/or special-purpose processing components having a processing power and a computing power. Some examples of the computing unit 701 include, but are not limited to, a central processing unit (CPU), a graphics processing unit (GPU), various special-purpose artificial intelligence (AI) computing chips, various computing units running a machine learning model algorithm, a digital signal processor (DSP), and any appropriate processor, controller, microcontroller, and the like. The computing unit 701 executes various methods and processes described above, such as the entity recognition method. For example, in some embodiments, the entity recognition method may be implemented as a computer software program that is tangibly included in a machine-readable medium, such as the storage unit 708. In some embodiments, some or all of the computer programs may be loaded and/or installed onto the device 700 via the ROM 702 and/or the communication unit 709. When the computer program is loaded into the RAM 703 and executed by the computing unit 701, one or more steps of the entity recognition method described above may be executed. Alternatively, in other embodiments, the computing unit 701 may be configured to execute the entity recognition method by any other appropriate approach (e.g., by means of firmware).

Various implementations of the systems and technologies described above herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), computer hardware, firmware, software, and/or a combination thereof. The various implementations may include: an implementation in one or more computer programs that are executable and/or interpretable on a programmable system including at least one programmable processor, which may be a special-purpose or general-purpose programmable processor, and may receive data and instructions from, and transmit data and instructions to, a storage system, at least one input apparatus, and at least one output apparatus.

Program codes for implementing the method of the present disclosure may be compiled using any combination of one or more programming languages. The program codes may be provided to a processor or controller of a general-purpose computer, a special-purpose computer, or other programmable data processing apparatuses, such that the program codes, when executed by the processor or controller, cause the functions/operations specified in the flow charts and/or block diagrams to be implemented. The program codes may be completely executed on a machine, partially executed on a machine, executed as a separate software package on a machine and partially executed on a remote machine, or completely executed on a remote machine or server.

In the context of the present disclosure, the machine-readable medium may be a tangible medium which may contain or store a program for use by, or used in combination with, an instruction execution system, apparatus or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any appropriate combination of the above. A more specific example of the machine-readable storage medium will include an electrical connection based on one or more pieces of wire, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination of the above.

To provide interaction with a user, the systems and technologies described herein may be implemented on a computer that is provided with: a display apparatus (e.g., a CRT (cathode ray tube) or a LCD (liquid crystal display) monitor) configured to display information to the user; and a keyboard and a pointing apparatus (e.g., a mouse or a trackball) by which the user can provide an input to the computer. Other kinds of apparatuses may be further configured to provide interaction with the user. For example, a feedback provided to the user may be any form of sensory feedback (e.g., visual feedback, auditory feedback, or haptic feedback); and an input may be received from the user in any form (including an acoustic input, a voice input, or a tactile input).

The systems and technologies described herein may be implemented in a computing system (e.g., as a data server) that includes a back-end component, or a computing system (e.g., an application server) that includes a middleware component, or a computing system (e.g., a user computer with a graphical user interface or a web browser through which the user can interact with an implementation of the systems and technologies described herein) that includes a front-end component, or a computing system that includes any combination of such a back-end component, such a middleware component, or such a front-end component. The components of the system may be interconnected by digital data communication (e.g., a communication network) in any form or medium. Examples of the communication network include: a local area network (LAN), a wide area network (WAN), and the Internet.

The computer system may include a client and a server. The client and the server are generally remote from each other, and usually interact via a communication network. The relationship between the client and the server arises by virtue of computer programs that run on corresponding computers and have a client-server relationship with each other. The server may be a cloud server, is also known as a cloud computing server or a cloud host, and is a host product in a cloud computing service system to solve the defects of difficult management and weak service extendibility existing in conventional physical hosts and virtual private servers (VPS); or may be a distributed system server, or may be a server combined with a blockchain.

The technical solutions according to the embodiments of the present disclosure provide an entity recognition method, which combines, based on a preliminary recognition result of an entity in a to-be-recognized image, a textual feature of a plurality of entities of a same category with an image feature of the to-be-recognized image, to determine the continuity of the plurality of entities, thereby solving the problem of the entity discontinuity, and improving the accuracy of entity recognition.

It should be understood that the various forms of processes shown above may be used to reorder, add, or delete steps. For example, the steps disclosed in the present disclosure may be executed in parallel, sequentially, or in different orders, as long as the desired results of the technical solutions provided in the present disclosure can be implemented. This is not limited herein.

The above specific implementations do not constitute any limitation to the scope of protection of the present disclosure. It should be understood by those skilled in the art that various modifications, combinations, sub-combinations, and replacements may be made according to the design requirements and other factors. Any modification, equivalent replacement, improvement, and the like made within the spirit and principle of the present disclosure should be encompassed within the scope of protection of the present disclosure.

What is claimed is:

1. An entity recognition method, comprising:
    recognizing a to-be-recognized image to determine a preliminary recognition result for entities in the to-be-recognized image, comprising obtaining text information and extracting entity information in the text information;
    determining, in response to determining that the preliminary recognition result includes a plurality of entities of a same category, which determines a likelihood that there is a named entity discontinuity in the preliminary recognition result, image features of the to-be-recognized image and textual features of the plurality of entities;
    determining whether the plurality of entities is a consecutive complete entity based on the image features and the textual features, to obtain a complete-entity determining result, comprising combining the image features with the textual features to obtain a combined feature, inputting the combined feature into a pre-trained complete entity determining model, and determining, by the pre-trained complete-entity determining model, whether the plurality of entities is a consecutive complete entity based on the combined feature; and
    obtaining a final recognition result based on the preliminary recognition result and the complete-entity determining result.

2. The method according to claim 1, wherein determining the image features of the to-be-recognized image and the textual features of the plurality of entities comprises:
    obtaining, by a pre-trained feature extracting model, a global image feature of the to-be-recognized image and local image features of local images corresponding to the plurality of entities in the to-be-recognized image; and
    determining a position embedding feature, a segment embedding feature, and a token embedding feature corresponding to each token in a token sequence, wherein the token sequence comprises a textual token corresponding to each preset-granularity text of the plurality of entities and an image token corresponding to each local image which corresponds to each of the plurality of entities in the to-be-recognized image, the position embedding feature is used for characterizing position information of each token, the segment embedding feature is used for characterizing segment information of each token, and the token embedding feature is used for characterizing embedding information of the preset granularity text corresponding to each token.

3. The method according to claim 2, wherein determining whether the plurality of entities is a consecutive complete entity based on the image features and the textual features, to obtain the complete-entity determining result comprises:
combining, for each textual token in the token sequence, the global image feature, the position embedding feature, the segment embedding feature, and the token embedding feature corresponding to the textual token, and/or, combining, for each image token in the token sequence, the local image feature, the position embedding feature, the segment embedding feature, and the token embedding feature corresponding to the image token, to obtain a combined feature; and
inputting the combined feature into a pre-trained complete-entity determining model, to determine whether the plurality of entities is a consecutive complete entity, and obtain the complete-entity determining result, wherein the complete-entity determining model is used for determining whether the plurality of entities characterized by the combined feature is a consecutive complete entity.

4. The method according to claim 3, wherein the complete-entity determining model is obtained by training as follows:
acquiring a training sample set, wherein training samples in the training sample set comprise a plurality of split entities and a relationship tag characterizing that the plurality of split entities belongs to a same complete entity; and
training the complete-entity determining model through a machine learning method, by using the plurality of split entities in the training samples as an input, and using the relationship tag in the inputted training samples as a desired output.

5. The method according to claim 2, wherein obtaining the final recognition result based on the preliminary recognition result and the complete-entity determining result comprises:
splicing the plurality of entities based on the preliminary recognition result, in response to determining that the plurality of entities characterized by the complete-entity determining result is a consecutive complete entity, to obtain a final recognition result.

6. The method according to claim 2, wherein recognizing the to-be-recognized image to determine the preliminary recognition result for the entities in the to-be-recognized image comprises:
recognizing the to-be-recognized image to obtain text information; and
extracting, by a pre-trained global pointer model, entities in the text information to obtain the preliminary recognition result, wherein the global pointer model is used for extracting the entities in the text information.

7. The method according to claim 1, wherein obtaining the final recognition result based on the preliminary recognition result and the complete-entity determining result comprises:
splicing the plurality of entities based on the preliminary recognition result, in response to determining that the plurality of entities characterized by the complete-entity determining result is a consecutive complete entity, to obtain a final recognition result.

8. The method according to claim 1, wherein recognizing the to-be-recognized image to determine the preliminary recognition result for the entities in the to-be-recognized image comprises:
recognizing the to-be-recognized image to obtain text information; and
extracting, by a pre-trained global pointer model, entities in the text information to obtain the preliminary recognition result, wherein the global pointer model is used for extracting the entities in the text information.

9. An entity recognition apparatus, comprising:
at least one processor; and
a memory storing instructions, wherein the instructions when executed by the at least one processor, cause the at least one processor to perform operations, the operations comprising:
recognizing a to-be-recognized image to determine a preliminary recognition result for entities in the to-be-recognized image, comprising obtaining text information and extracting entity information in the text information;
determining, in response to determining that the preliminary recognition result includes a plurality of entities of a same category, which determines a likelihood that there is a named entity discontinuity in the preliminary recognition result, image features of the to-be-recognized image and textual features of the plurality of entities;
determining whether the plurality of entities is a consecutive complete entity based on the image features and the textual features, to obtain a complete-entity determining result comprising combining the image features with the textual features to obtain a combined feature, inputting the combined feature into a pre-trained complete entity determining model, and determining, by the pre-trained complete-entity determining model, whether the plurality of entities is a consecutive complete entity based on the combined feature; and
obtaining a final recognition result based on the preliminary recognition result and the complete-entity determining result.

10. The apparatus according to claim 9, wherein determining the image features of the to-be-recognized image and the textual features of the plurality of entities comprises:
obtaining, by a pre-trained feature extracting model, a global image feature of the to-be-recognized image and local image features of local images corresponding to the plurality of entities in the to-be-recognized image; and determining a position embedding feature, a segment embedding feature, and a token embedding feature corresponding to each token in a token sequence, wherein the token sequence comprises a textual token corresponding to each preset-granularity text of the plurality of entities and an image token corresponding to each local image which corresponds to each of the plurality of entities in the to-be-recognized image, the position embedding feature is used for characterizing position information of each token, the segment embedding feature is used for characterizing segment information of each token, and the token embedding feature is used for characterizing embedding information of the preset granularity text corresponding to each token.

11. The apparatus according to claim 10, wherein determining whether the plurality of entities is a consecutive complete entity based on the image features and the textual features, to obtain the complete-entity determining result comprises:
combining, for each textual token in the token sequence, the global image feature, the position embedding feature, the segment embedding feature, and the token embedding feature corresponding to the textual token, and/or, combining, for each image token in the token sequence, the local image feature, the position embedding feature, the segment embedding feature, and the token embedding feature corresponding to the image token, to obtain a combined feature; and inputting the combined feature into a pre-trained complete-entity determining model, to determine whether the plurality of entities is a consecutive complete entity, and obtain the complete-entity determining result, wherein the complete-entity determining model is used for determining whether the plurality of entities characterized by the combined feature is a consecutive complete entity.

12. The apparatus according to claim 11, wherein the complete-entity determining model is obtained by training as follows:

acquiring a training sample set, wherein training samples in the training sample set comprise a plurality of split entities and a relationship tag characterizing that the plurality of split entities belongs to a same complete entity; and training the complete-entity determining model through a machine learning method, by using the plurality of split entities in the training samples as an input, and using the relationship tag in the inputted training samples as a desired output.

13. The apparatus according to claim 9, wherein obtaining the final recognition result based on the preliminary recognition result and the complete-entity determining result comprises:

splicing the plurality of entities based on the preliminary recognition result, in response to determining that the plurality of entities characterized by the complete entity determining result is a consecutive complete entity, to obtain a final recognition result.

14. The apparatus according to claim 9, wherein recognizing the to-be-recognized image to determine the preliminary recognition result for the entities in the to-be-recognized image comprises:

recognizing the to-be-recognized image to obtain text information; and extracting, by a pre-trained global pointer model, entities in the text information to obtain the preliminary recognition result, wherein the global pointer model is used for extracting the entities in the text information.

15. A non-transitory computer readable storage medium storing computer instructions, wherein the computer instructions are used for causing a computer to execute operations comprising:

recognizing a to-be-recognized image to determine a preliminary recognition result for entities in the to-be-recognized image, comprising obtaining text information and extracting entity information in the text information;

determining, in response to determining that the preliminary recognition result includes a plurality of entities of a same category, which determines a likelihood that there is a named entity discontinuity in the preliminary recognition result, image features of the to-be-recognized image and textual features of the plurality of entities;

determining whether the plurality of entities is a consecutive complete entity based on the image features and the textual features, to obtain a complete-entity determining result comprising combining the image features with the textual features to obtain a combined feature, inputting the combined feature into a pre-trained complete entity determining model, and determining, by the pre-trained complete-entity determining model, whether the plurality of entities is a consecutive complete entity based on the combined feature; and obtaining a final recognition result based on the preliminary recognition result and the complete-entity determining result.

16. The non-transitory computer readable storage medium according to claim 15, wherein determining the image features of the to-be-recognized image and the textual features of the plurality of entities comprises:

obtaining, by a pre-trained feature extracting model, a global image feature of the to-be-recognized image and local image features of local images corresponding to the plurality of entities in the to-be-recognized image; and determining a position embedding feature, a segment embedding feature, and a token embedding feature corresponding to each token in a token sequence, wherein the token sequence comprises a textual token corresponding to each preset-granularity text of the plurality of entities and an image token corresponding to each local image which corresponds to each of the plurality of entities in the to-be-recognized image, the position embedding feature is used for characterizing position information of each token, the segment embedding feature is used for characterizing segment information of each token, and the token embedding feature is used for characterizing embedding information of the preset granularity text corresponding to each token.

17. The non-transitory computer readable storage medium according to claim 16, wherein determining whether the plurality of entities is a consecutive complete entity based on the image features and the textual features, to obtain the complete-entity determining result comprises:

combining, for each textual token in the token sequence, the global image feature, the position embedding feature, the segment embedding feature, and the token embedding feature corresponding to the textual token, and/or, combining, for each image token in the token sequence, the local image feature, the position embedding feature, the segment embedding feature, and the token embedding feature corresponding to the image token, to obtain a combined feature; and inputting the combined feature into a pre-trained complete-entity determining model, to determine whether the plurality of entities is a consecutive complete entity, and obtain the complete-entity determining result, wherein the complete-entity determining model is used for determining whether the plurality of entities characterized by the combined feature is a consecutive complete entity.

18. The non-transitory computer readable storage medium according to claim 17, wherein the complete-entity determining model is obtained by training as follows:

acquiring a training sample set, wherein training samples in the training sample set comprise a plurality of split entities and a relationship tag characterizing that the plurality of split entities belongs to a same complete entity; and training the complete-entity determining model through a machine learning method, by using the plurality of split entities in the training samples as an input, and using the relationship tag in the inputted training samples as a desired output.

19. The non-transitory computer readable storage medium according to claim 15, wherein obtaining the final recognition result based on the preliminary recognition result and the complete-entity determining result comprises:
  splicing the plurality of entities based on the preliminary recognition result, in response to determining that the plurality of entities characterized by the complete-entity determining result is a consecutive complete entity, to obtain a final recognition result.

20. The non-transitory computer readable storage medium according to claim 15, wherein recognizing the to-be-recognized image to determine the preliminary recognition result for the entities in the to-be-recognized image comprises:
  recognizing the to-be-recognized image to obtain text information; and
  extracting, by a pre-trained global pointer model, entities in the text information to obtain the preliminary recognition result, wherein the global pointer model is used for extracting the entities in the text information.

* * * * *